Oct. 8, 1957 — H. S. FRAKES — 2,809,248
OIL FILTER SIGNALLING MEANS

Filed March 4, 1954 — 2 Sheets-Sheet 1

INVENTOR.
Hershal S. Frakes
BY
ATTORNEY.

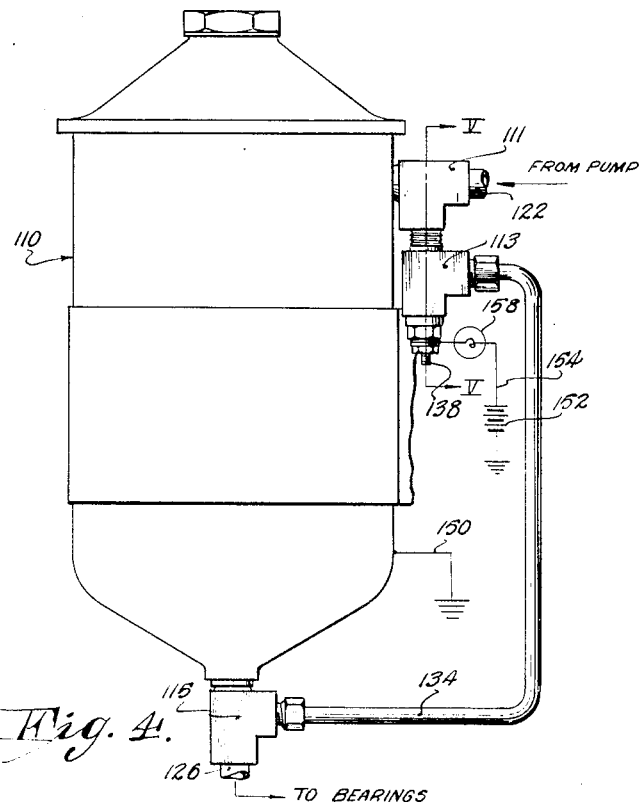
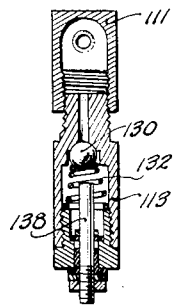
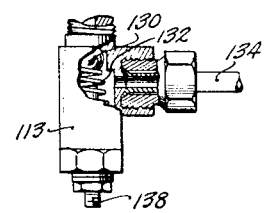
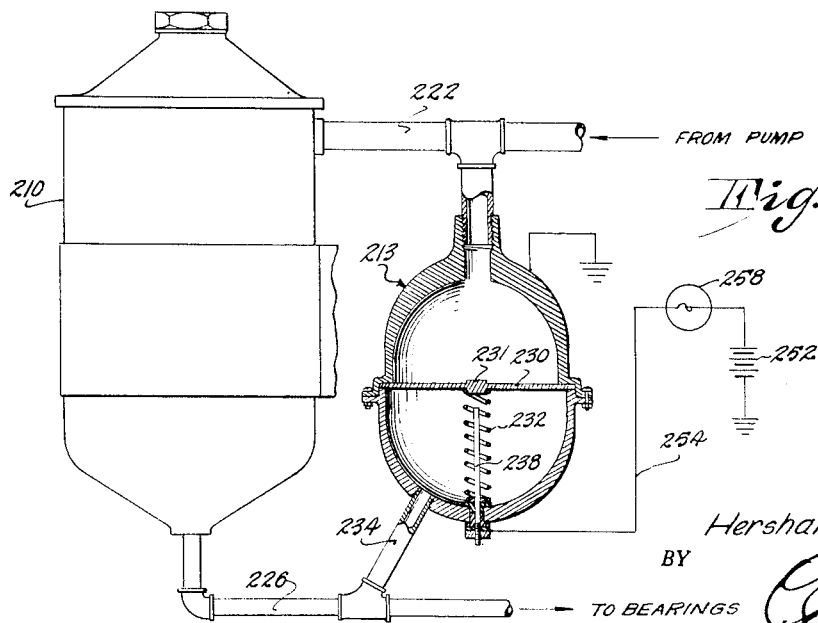
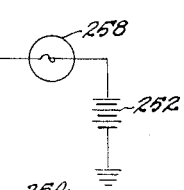

2,809,248
OIL FILTER SIGNALLING MEANS

Hershal S. Frakes, Kansas City, Kans., assignor of one-third to James F. Tapp and one-third to Ernest A. Tapp, Kansas City, Mo.

Application March 4, 1954, Serial No. 414,150

1 Claim. (Cl. 200—81.9)

This invention relates to signalling means for oil filter systems, particularly those utilized in connection with internal combustion engines such as automobile engines to filter the oil as it is pumped to and from the engine bearings.

It is the primary object of the present invention to provide an inexpensive and efficient signalling means in the nature of that disclosed in my copending application Serial No. 325,405, filed December 1, 1952, this being a continuation-in-part of said application.

The most important object of the present invention is to provide a signal directly responsive to a drop in pressure at the outlet of the filter below the pressure at the inlet end thereof occasioned by clogging of the filtering material so as to provide an immediate warning of such unsatisfactory condition and need of replacement of the filter cartridge.

Another important object of this invention is the provision of a signalling system operable in connection with a movable member within the oil line that automatically shifts toward one end of its path of travel when the filter becomes clogged and capable of closing an electric circuit and thereby energizing a signal therewithin immediately upon such shifting of the said movable member.

A further object of this invention is the provision of a signalling means operable upon the aforesaid principles and capable of being used in a number of ways and in connection with filtering systems of all types.

In the drawings:

Fig. 4 is an elevational view of a modified form of filter and illustrating another embodiment of the present invention.

Fig. 5 is a cross-sectional view taken on line V—V of Fig. 4.

Fig. 6 is a fragmentary, elevational view similar to Fig. 4, parts being broken away and in section for clearness; and Fig. 7 is an elevational view of an oil filter having another modification of the present invention operably connected therewith and shown in section.

Figure 1:
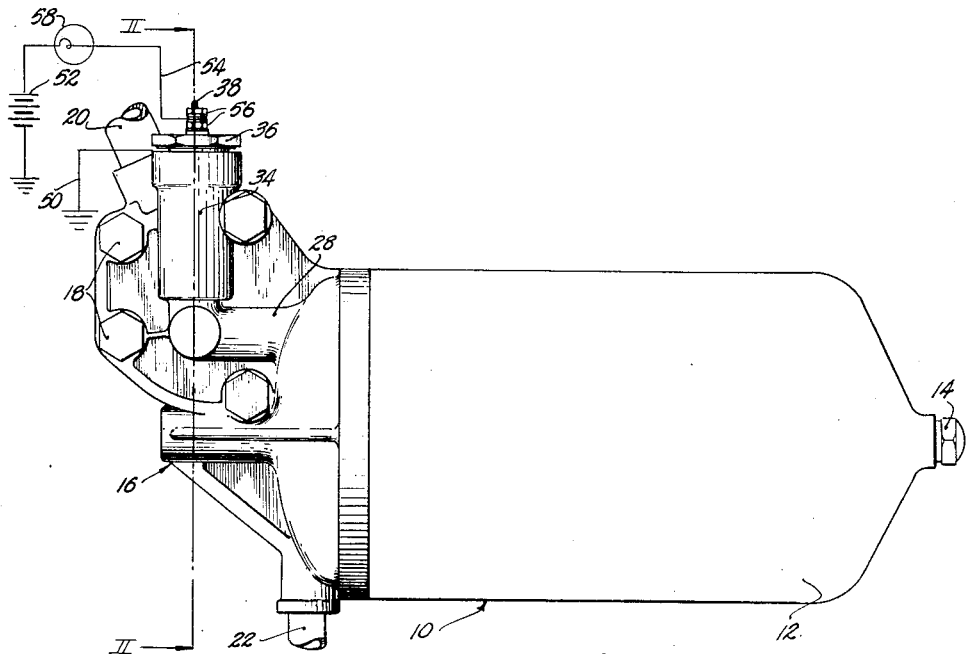
Figure 1 is a side elevational view of one form of conventional oil filter embodying the principles of the present invention.

The details of construction of the filters illustrated in Figs. 1, 4 and 7 have not been shown in the drawings for the same forms no part of the present invention and such details are well understood by those skilled in this art.

Figure 2:
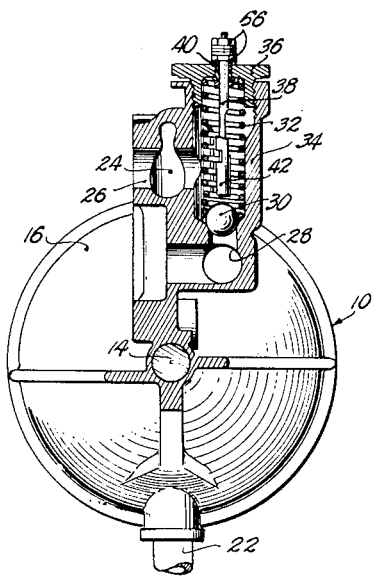
Fig. 2 is a cross-sectional view taken on line II—II of Fig. 1.

It is suffice to point out that in each case there is included a suitable filtering cartridge through which oil is pumped or recirculated, and in Figs. 1 and 2 the filter is broadly designated by the numeral 10. The said cartridge is contained within a removable hollow cylinder 12 that is held in place by a through-bolt 14 attached to a head broadly designated by the numeral 16.

In the form of filtering means shown in Figs. 1 and 2, the head 16 is attached directly to the internal combustion engine by a plurality of studs 18 and a pipe 20, connected with the head 16, leads to a pressure gauge (not shown) in the usual manner. Oil emanating from the pump that is in turn operated by the engine is directed to the head 16 by way of a pipe 22 whence the oil is forced through the filtering cartridge within the cylinder 12. The filtered oil passes from the cylinder 12 into the head 16 by way of a conduit 24 and thence from the head 16 to the bearings of the engine by way of a lateral passage 26 that communicates with the engine.

After the filtering material within the cylinder 12 becomes clogged, it is by-passed by the oil since the latter then flows into the head 16 by way of a by-pass conduit 28. The increased pressure at the inlet pipe 22 and the drop in pressure in passage 26, causes a ball valve 30 to unseat against the action of a spring 32, the oil thereupon flowing to the passage 26 from by-pass conduit 28 by way of a tubular part 34 integral with the head 16.

The tube 34 is conventionally provided with a cap 36 against which the uppermost end of the spring 32 bears, and in accordance with the principles of the instant invention a stationary conductor pin 38 is secured rigidly to the cap 36. A suitable bushing 40 within the cap 36 insulates the conductor pin 38 from the cap 36 as seen in Figure 2. A hollow tube 42 mounted on the lowermost and innermost end of the pin 38, has an indentation 44 riding within a notch 46 in the pin 38 and a spring 48 within the tube 42 bears against the lowermost end of the pin 38 to yieldably hold the tube 42 biased toward the lowermost end of its path of travel.

Manifestly, pin 38, tube 42 and spring 48 are all of conductive material such as metal, as is the ball valve 30. The head 16 may be grounded in any suitable manner such as by use of a conductor 50 and the pin 38 is coupled with battery 52 by a wire 54. Fastening nuts 56 on the uppermost end of pin 38 are used to fasten the wire 54 thereto. Any suitable signalling means such as a lamp 58, may be interposed in the wire 54 for energization whenever a circuit is established by engagement of the valve 30 with the tube 52. In this connection, it is seen that as soon as a pressure differential exists within the oil line from the pump to the bearings, sufficient to cause unseating of the valve 30, the latter will move into engagement with the tube 42 and close the circuit from ground conductor 50, through the tubular portion 34 of head 16, spring 32, valve 30, tube 42 and conductor pin 38 to wire 54. Clogging of the filter material causing by-pass of the oil is, therefore, immediately made known by virtue of energization of signal 58.

Figures 3, 3A:
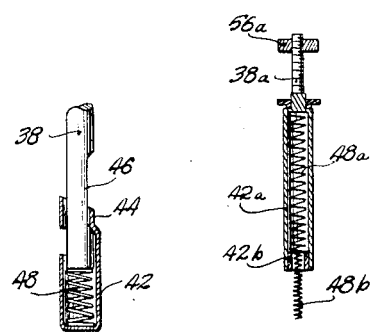
Fig. 3 is an enlarged, fragmentary, detailed view partially in section and illustrating the stationary conductor of the electrical system forming a part of the signalling means of Figs. 1 and 2.
Fig. 3a is a sectional view illustrating a modified form of stationary conductor adapted to be used in the modification of Figs. 1 and 2.

Alternately a conductor such as shown in Fig. 3a may be used within the tubular portion 34 of head 16. It consists of an elongated tube 42a containing a spring 48a held in place at its lowermost end by a collar 42b tightly fitted within the tube 42a. Spring 48a has a length 48b of reduced diameter that passes through the collar 42b and projects downwardly below the tube 42a.

Tube 42a has a screw threaded pin 38a adapted for connection with the cap 36 by a nut 56a. When the embodiment shown in Fig. 3a is utilized, it is insulated from the cap 36 in much the same manner as shown in Fig. 2. It is clear that when valve 30 rises and comes into contact with spring length 48b, the circuit will be established in the same manner as above described. The resilient nature of springs 48 and 48a permits the valve 30 to rise within the head 16 to varying heights depending upon the extent of pressure differential.

In Figs. 4 to 6 inclusive, there is shown an embodiment of the present invention operably coupled with a filter broadly designated by the numeral 110. A coupling 111 interposed within oil inlet line 122 for filter 110, has a second coupling 113 connected therewith. A coupling 115 attached to the filter 110 is interposed in outlet pipe 126 for the filter 110. The couplings 113 and 115 are interconnected by by-pass line 134. Normally there is no flow of oil in the by-pass 134, but when the filtering material within filter 110 becomes clogged, the increase of pressure within the pipe 122 acting on a ball valve 130 and overcoming the pressure in by-pass 134 acting on valve 130 in the opposite direction, unseats the valve 130. Valve 130 in coupling 113, is yieldably held in the closed position by spring 132 that surrounds a conductor pin 138 secured to the coupling 113 and insulated therefrom. Here again, the signal may consist of a lamp 158 within an electric line 154 that interconnects conductor pin 138 and battery 152.

A suitable grounding wire 150 may be provided to establish a complete circuit through the signal 158 whenever the valve 130 moves into engagement with the uppermost end of the contact 138.

In Fig. 7 of the drawings, filter 210 is provided with an inlet line 222 and an outlet line 226. A hollow body 213 is interposed within a by-pass 234 interconnecting the lines 222 and 226. Body 213 is partitioned by a flexible metallic diaphragm 230, thereby separating the lines 222 and 226. Obviously, diaphragm 230 is subjected to the opposed pressures of lines 222 and 226 and whenever oil flows freely through the filter 210, diaphragm 230 is in the position shown by Fig. 7.

A spring 232 surrounds a conductor pin 238 and bears against the lowermost face of the diaphragm 230. Pin 238 is insulated from the body 213 and coupled within an electric line 254 that joins with a battery 252. A suitable signal such as a lamp 258 is interposed in the line 254. Pin 238 is within the path of travel of a central boss 231 on the diaphragm 230 and which is held out of contact with the conductor 238 by the action of spring 232 bearing against the lower face of diaphragm 230.

Spring 232 is also insulated away from the body 213 at its lowermost end, but when the pressure above the diaphragm 230 increases because of a clogging of the filtering material within the filter 210, diaphragm 230 will flex downwardly to move the boss 231 into engagement with the pin 238. This establishes a circuit through the signal 258, thereby providing a warning of the necessity of changing the filter cartridge.

Having thus described the invention what is claimed as new and desired to be secured by Letters Patent is:

In a signal for an oil filtering system having a filtering unit provided with a valved by-pass for flow of oil upon clogging of said unit, there being a spring loaded, normally closed valve in said by-pass, the improvement including: an elongated, stationary pin extending into said by-pass in alignment with the path of travel of the valve; a tube normally spaced from the valve and telescoped on said pin for reciprocation longitudinally of the latter toward and away from the valve; and a spring in the tube, engaging the pin and yieldably biasing the tube toward the valve for cushioning the valve upon movement of the latter to an open position engaging the tube, said pin having a longitudinal notch, said tube having an indentation within the notch for limiting the extent of movement of the tube toward and away from the valve, said valve, said tube and said pin being of electrically conductive material and being adapted for coupling with an electric signalling circuit whereby the latter is energized only upon movement of the valve into engagement with the tube.

References Cited in the file of this patent

UNITED STATES PATENTS

| | | |
|---|---|---|
| 808,929 | Kettering | Jan. 2, 1906 |
| 1,309,362 | Lehmann | July 8, 1919 |
| 1,340,668 | Papini | May 18, 1920 |
| 1,611,219 | Minninger | Dec. 21, 1926 |
| 2,348,651 | Schelly | May 9, 1944 |
| 2,497,375 | Seguin et al. | Feb. 14, 1950 |
| 2,499,494 | Greer | Mar. 7, 1950 |
| 2,638,581 | Marvel | May 12, 1953 |

FOREIGN PATENTS

| | | |
|---|---|---|
| 115,010 | Switzerland | July 20, 1925 |
| 157,550 | Great Britain | Jan. 17, 1921 |
| 581,478 | France | Sept. 29, 1924 |
| 649,640 | Great Britain | July 30, 1951 |